United States Patent [19]
McWilliams

[11] 3,988,190
[45] Oct. 26, 1976

[54] METHOD OF FORMING THERMAL INSULATION MATERIALS

[75] Inventor: Joseph Anthony McWilliams, Kidderminster, England

[73] Assignee: Micropore Insulation Limited, Kidderminster, England

[22] Filed: Oct. 6, 1970

[21] Appl. No.: 78,487

[52] U.S. Cl. ............... 156/145; 156/191; 156/194; 156/195; 156/196; 156/200; 156/214; 156/221; 156/244

[51] Int. Cl.² ............... A63B 39/00; A63B 41/00; B32B 31/00

[58] Field of Search ............ 161/159; 156/145, 191, 156/194, 195, 196, 214, 200, 221, 244, 198

[56] References Cited
UNITED STATES PATENTS

| 2,998,339 | 8/1961 | Barnes | 156/194 |
| 3,414,448 | 12/1968 | Harpfer | 156/196 |
| 3,700,520 | 10/1972 | Hielema | 161/145 |

FOREIGN PATENTS OR APPLICATIONS

| 1,053,599 | 3/1959 | Germany | 156/222 |

Primary Examiner—Marion E. McCamish
Attorney, Agent, or Firm—Burgess Ryan and Wayne

[57] ABSTRACT

Shaped insulation material is formed by passing a porous envelope containing insulation material such as that comprising silica aerogel and an opacifier through a series of rolls followed by making the shape so formed rigid.

5 Claims, 6 Drawing Figures

U.S. Patent    Oct. 26, 1976    3,988,190
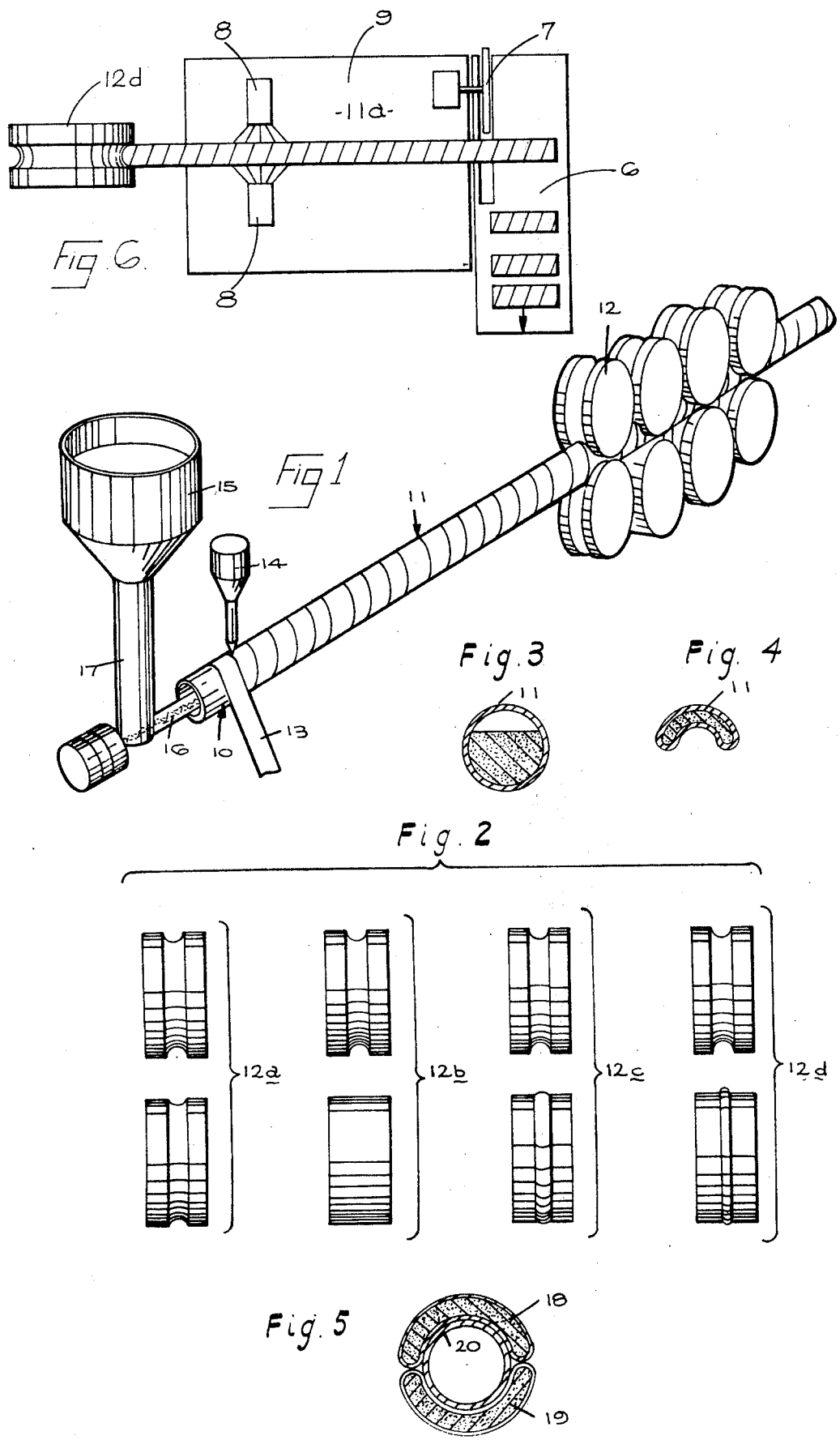

METHOD OF FORMING THERMAL INSULATION MATERIALS

BACKGROUND OF THE INVENTION

1. Field of the Invention

This invention relates to a method of forming thermal insulation material into a desired sectional shape, such material being for use, for example, as pipe insulation in which application the desired sectional shape will be semi-circular.

2. Description of the Prior Art

One of the conventional materials used for pipe insulation is calcium silicate reinforced with asbestos fibre and this is in some cases prepared in the form of a wet slurry and such slurry is processed into the desired sectional shape by confining it between a central core and a pair of outer die members and then baking it for the necessary period in order to obtain the finished product. Such a method is essentially slow in that the separate steps of filling, baking and stripping are involved.

Thermal insulation materials of the microporous type which are characterised in that they are an intimate dry powder mix of free-flowing or substantially free-flowing consistency have thermal insulation characteristics superior to those of conventional materials but, because of their physical nature, are extremely difficult to form into the desired shape for use as, for example, pipe insulation.

The objects of the present invention include the provision of an improved method for forming thermal insulation materials into a desired sectional shape such as will enable more rapid production of such shapes to be achieved using a mix in the form of a dry powder or wet slurry and which will also enable microporous insulation materials to be formed into sectional shapes.

SUMMARY OF THE INVENTION

The insulation material is injected into a confining envelope of porous material and this envelope containing the insulation material is passed between rollers so as to impart the desired shape thereto and this shape is maintained by rendering the shaped envelope and insulation material rigid.

BRIEF DESCRIPTION OF THE DRAWINGS

In the drawings:

FIG. 1 is a diagrammatic representation of apparatus for use in forming thermal insulation material into a desired sectional shape, FIG. 2 illustrates four sets of rollers which form part of the apparatus shown in FIG. 1, FIG. 3 is a sectional view of the thermal insulation material prior to it being passed between the sets of rollers, FIG. 4 is a sectional view of the thermal insulation material after it has passed between the sets of rollers, FIG. 5 is a view showing the formed thermal insulation material used as a jacket-type insulator for a steam pipe, and FIG. 6 is a plan view showing the application of a rigidising layer to the shaped insulation material.

DESCRIPTION OF THE PREFERRED EMBODIMENTS

The particular form of apparatus shown in the drawing is for use in forming microporous insulation material, such as that comprising silica aerogel, a minor proportion of an opacifier and ceramic fibres into lengths of semi-circular section rigid material for use as pipe insulation. The apparatus consists basically of a hollow cylindrical mandrel 10 over which a confining envelope 11 is passed, the microporous insulating material being fed into the envelope through the mandrel 10 and being thereafter passed between the operative surfaces of a set of shaping rolls 12.

The method involves the basic steps of providing a confining envelope of porous material which is filled continuously with the microporous material during its passage through the apparatus followed by passage of the filled envelope between the pair of shaping rolls 12 so as to change the shape of the envelope from a circular section as illustrated in FIG. 3 to a generally semi-circular section as indicated in FIG. 4. After such shaping of the envelope, the envelope is sprayed or coated with a suitable ceramic stiffener so as to strengthen and rigidise the sectional shape so formed.

The confining envelope 11 can consist of glass cloth which has a sufficient porosity to enable the surplus air in the microporous material to be expelled partly during the filling and partly during the subsequent shaping operation. A web 13 of glass cloth is fed to the mandrel 10 intermediate the ends thereof and the web is thereafter guided round the mandrel 10 so as to form the web into a cylindrical shape and so as to overlap the edges thereof. As the web of glass cloth is pulled along the mandrel 10 — by the action of the shaping rolls 12 — so the over-lapping edges are secured together by glueing, the glue being fed from a delivery device 14, so as to form a closed cylindrical envelope. In an alternative arrangement the overlapping edges of the web of glass cloth may be secured together by stitching. The microporous material is fed from a hopper 15 and the arrangement is that, as the closed or formed envelope 11 passes over the open end of the mandrel 10, so the microporous material is fed into the envelope through the hollow mandrel 10. The mandrel 10 has associated with it a screw injector 16 for the delivery of the microporous material from the delivery spout 17 of the hopper 15 to the end of the mandrel 10 adjacent the shaping rolls 12.

There is thus provided a cylinder of encased microporous insulation material which is then passed between the pairs of forming rolls 12 which not only serve to impart the desired sectional shape to the previously cylindrical envelope and thermal insulating material confined therein but which also serve to remove surplus air from the encased insulating material as well as advancing the material through the apparatus so that a continuous production of shaped insulation material will be obtained.

The rolls 12 are of conventional form and, as shown in FIG. 2, have sectional shapes such that the alteration as between a circular section and a semi-circular section for the insulation material is progressively achieved. The first pair 12a of rolls consist of one roll which has a substantially semi-circular cross-section recess therein and a second roll which has a recess therein of slightly less curvature. The second pair 12b of rolls consist of a first roll having the same configuration as the one roll of the pair 12a and a second roll which is of generally cylindrical configuration. The third pair 12c of rolls consists of a first roll having the same configuration as before and a second roll having an arcuate cross-section projection arranged in register with the recess of the one roll. The fourth pair 12d of rolls comprises a first roll having the same construction as before and a second roll having a projection arranged to mate with the recess of the one roll so that the pair 12d of rolls mate one with the other.

There is a gap or pass between the final pair 12d of rolls, the gap or pass corresponding to the thickness which is desired for the finished article. The size of the mandrel and the width of the web 13 of glass cloth will, of course be equated to the thickness which is required for the finished product. For sections of pipe insulation material of substantial thickness, the glass cloth is preferably of a greater weight and strength than that which would be used for sections of less thickness.

After passing through the final pair 12d of shaping rolls the formed section 11a is passed to a supporting bed 9 on which there are spray elements 8 arranged so that the confining envelope of the formed section 11a is sprayed or coated with a suitable ceramic stiffener thus imparting to the envelope the necessary rigidity for retaining the encased material in the sectional shape to which it has been formed. Thereafter the rigidised, encased and formed insulation material is cut into the desired lengths by a suitable saw 7 which may be a traversing rotating saw mounted on the bed 9 and cuts the formed sections into lengths which are passed to a delivery position by an inclined chute 6.

As with more conventional pipe insulation material used heretofore two semi-circular section lengths 18 and 19 are placed around a given length of pipe 20 as shown in FIG. 5 and the lengths 18 and 19 are retained in abutting relationship with one another around the pipe 20 by means of suitable externally mounted bands or straps (not shown).

In a case where the thermal insulation material is to be used as a jacket for an article which is of substantially greater size than a steam pipe or which is of a more complex shape, the jacket can be built up from a plurality of units which, when placed in their appropriate positions around the article which is to be insulated, are retained in position by means of external straps or bands.

If a wet slurry is used instead of a dry free-flowing mix of a microporous insulation material, the process is the same as that described above save that, during the passage of the filled envelope through the shaping rolls and whilst the finally shaped material is supported on a bed or the like after passing through the final set of rolls, heat is applied so as to drive off surplus moisture and to cause the slurry of insulation material to dry and set. The rigidity of the set slurry may be sufficient to permit one to omit coating of the formed envelope with a rigidising layer of, for example, a ceramic stiffener. In some cases, however, a rigidising layer will be applied to the formed envelope.

The porous envelope 11 will permit the escape of surplus moisture during the forming operation as the material passes between the sets of rollers and the expansion gases liberated during the heating stage will escape through the porous envelope 11.

I claim:

1. A method of forming thermal insulation material into a desired sectional shape, which method comprises injecting a quantity of free flowing thermal insulation material into a confining envelope of porous material sufficient to only partially fill said envelope, passing said envelope containing the insulation material between rollers so as to impart said desired shape thereto and then treating the combined shaped envelope and insulation material to render the combination rigid.

2. A method according to claim 1 wherein said step of injecting comprises injecting the insulation material into the envelope as a wet slurry and said treating comprises applying heat to the combined envelope and material during and immediately after passage of the envelope through the rollers so as to effect setting of the slurry to impart the necessary rigidity to the insulation material.

3. A method according to claim 1 wherein the insulation material is a powdered microporous material and wherein said treatment operation comprises applying a rigidising material to the porous envelope.

4. A method according to claim 1 wherein the confining envelope is of cylindrical form comprising passing said envelope continuously over the end of a mandrel and injecting the insulation material into the envelope through said mandrel.

5. A method according to claim 1 wherein the cylindrical envelope is formed from a web of porous material comprising feeding said web to a mandrel and passing the web round the mandrel so that the edges of said web overlap, and securing such overlapping edges of the web together.

* * * * *